United States Patent [19]
Cussac

[11] Patent Number: 5,853,151
[45] Date of Patent: Dec. 29, 1998

[54] BRAKING SHIELD FOR A SPACECRAFT, AND A SATELLITE FITTED THEREWITH

[75] Inventor: Thibery Cussac, Toulouse, France

[73] Assignee: Centre National D'Etudes Spatiales, Paris, France

[21] Appl. No.: 849,903

[22] PCT Filed: Dec. 18, 1995

[86] PCT No.: PCT/FR95/01687

§ 371 Date: Aug. 27, 1997

§ 102(e) Date: Aug. 27, 1997

[87] PCT Pub. No.: WO96/19382

PCT Pub. Date: Jun. 27, 1996

[51] Int. Cl.[6] .................................................. B64G 1/58
[52] U.S. Cl. ............................... 244/158 A; 244/138 R; 244/160; 102/386
[58] Field of Search ......................... 244/138 R, 158 R, 244/160, 158 A, 142; 102/337, 386, 387, 382, 405

[56] References Cited

U.S. PATENT DOCUMENTS

| 3,098,630 | 7/1963 | Cinnors | 244/113 |
| 3,405,887 | 10/1968 | Mixson | 244/138 R |
| 3,604,667 | 9/1971 | Moraes | 244/138 R |
| 5,080,306 | 1/1992 | Porter et al. | 244/158 A |
| 5,108,046 | 4/1992 | Chaumette et al. | 244/160 |

*Primary Examiner*—Galen L. Barefoot
*Attorney, Agent, or Firm*—Pollock, Vande Sande & Amernick

[57] ABSTRACT

The invention relates to a braking and heat protection shield (1) for a spacecraft (5), said shield being situated at the front of the spacecraft to oppose a flow of gas striking the spacecraft, and including at least one gap (3a, ..., 3d) shaped to present a through section to the flow that increases with increasing angle of incidence of the spacecraft, to create an aerodynamic force couple tending to return the spacecraft towards a position of lesser incidence.

8 Claims, 1 Drawing Sheet

U.S. Patent     Dec. 29, 1998     5,853,151
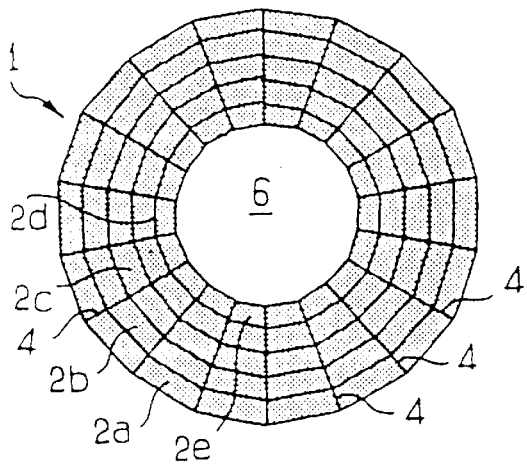
FIG_1
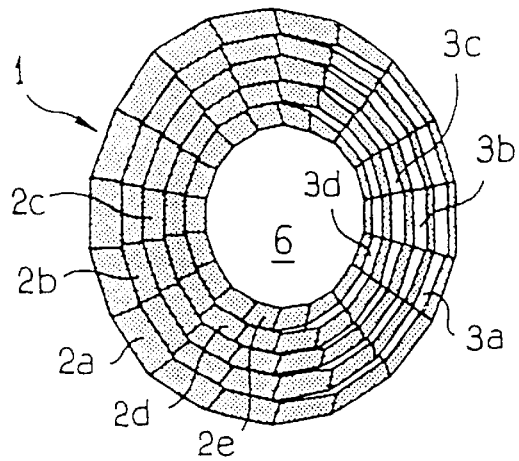
FIG_3
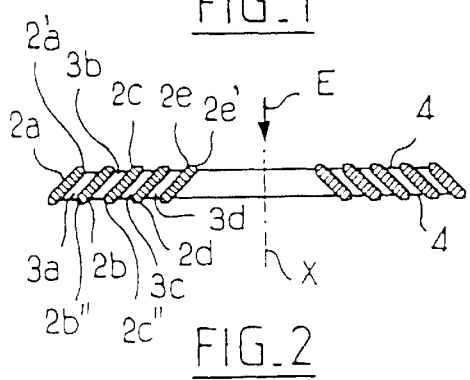
FIG_2
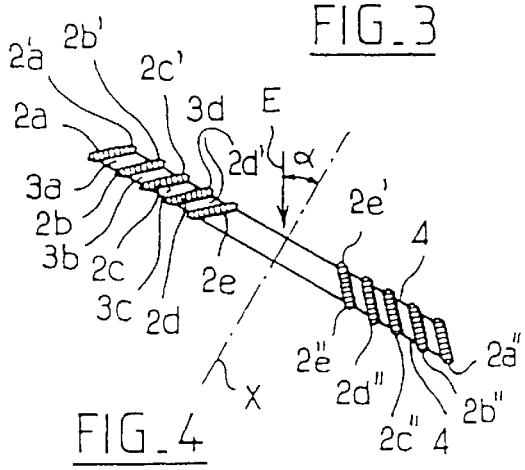
FIG_4
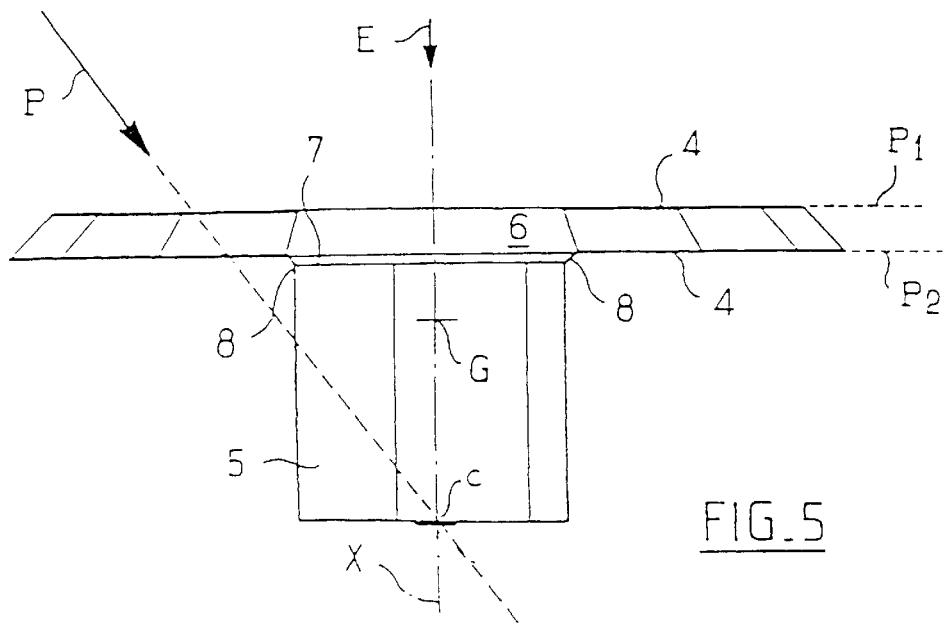
FIG_5

BRAKING SHIELD FOR A SPACECRAFT, AND A SATELLITE FITTED THEREWITH

The present invention relates to a braking shield for a spacecraft, and more precisely, but not exclusively, a shield that is designed to slow down an earth observation satellite by friction with the layers of the atmosphere at low altitude (typically 120 km to 140 km).

To put a satellite into low orbit, it is possible to use a specially adapted launcher.

Nevertheless, it is sometimes economically more advantageous to take advantage, whenever possible, of space that remains available in the nosecone of a standard launcher adapted to put a payload into high orbit, and then to actuate propulsion means with which the satellite is fitted to send it into low orbit.

To reduce the quantity of propellant on board the satellite, proposals have been made to place a braking drag at the back of the satellite for the purpose of slowing down the satellite by friction with the low altitude layers of the atmosphere and consequently of reducing the apogee altitude of the satellite's orbit. The satellite propulsion means are then no longer actuated for performing braking directly, but for the purpose of sending the satellite into the low altitude layers of the atmosphere where it loses energy by friction and then, after braking, to cause it to leave those layers of the atmosphere in order to reach its final orbit.

The braking drag is placed at the back of the satellite so as to impart a stable attitude to the satellite, i.e. an angle of incidence that is constant relative to the flow of gas striking it.

Braking shields are also known for atmospheric re-entry of craft that have gone beyond the atmosphere, with such shields being in the form of nosecone-shaped shells (to impart a stable attitude to the spacecraft) placed at the front thereof, and also providing heat protection to the spacecraft fitted therewith by deflecting the flow of gases.

It is desirable to fit satellites with shields that are placed in front so as to combine the functions of providing both braking and heat protection. Nevertheless, because such shields are nosecone-shaped, they sometimes take up more room in a longitudinal direction than is compatible with the space available in the nosecone of the launcher, particularly when advantage is being taken of some other satellite being put into a high orbit by a standard launcher, as mentioned above.

The present invention seeks to propose a novel braking shield for a spacecraft, in particular an observation satellite, the shield being of size compatible with the space available under the nosecone of a launcher, and serving to provide the spacecraft simultaneously with attitude stability and with heat protection.

The shield of the invention is characterized in that it includes at least one gap shaped in such a manner as to provide a through section to the flow of gas striking the spacecraft, which section increases with increasing angle of incidence of the spacecraft, for the purpose of creating an aerodynamic force couple tending to return the spacecraft towards a position of lower incidence.

Thus, the invention serves to stabilize the attitude of the satellite in passive manner, without it being necessary to adopt a nosecone-shaped shell.

In a preferred embodiment of the invention, the shield comprises a succession of walls having axial symmetry about the longitudinal axis of the spacecraft, said walls being coaxial and leaving between them at least one annular opening of through section offered to the flow that increases with increasing angle of incidence of the spacecraft. Preferably, the shield includes a succession of truncated cones disposed coaxially so as to appear as a solid surface in front view at zero incidence, and, at non-zero incidence, to appear as a surface having gaps creating an aerodynamic couple tending to return the spacecraft towards a position of zero incidence.

The present invention also provides a satellite fitted with a shield as specified above.

Other characteristics and advantages of the present invention appear on reading the following detailed description of a non-limiting embodiment of the invention, and on examining the accompanying drawing, in which:

FIG. 1 is a front view of a shield of the invention at zero incidence;

FIG. 2 is an axial section through the shield shown in FIG. 1;

FIG. 3 is a view analogous to FIG. 1, at non-zero incidence;

FIG. 4 is an axial section through the shield as shown in FIG. 3; and

FIG. 5 is a diagrammatic side view of a satellite fitted with the shield of the invention as shown in FIGS. 1 to 4.

The shield 1 shown in the figures has walls referenced $2a, \ldots, 2e$ which are in the form of truncated cones in the example described and which are axially symmetrical about an axis of symmetry X that is normal to the plane of FIG. 1 and that is contained in the section plane of FIGS. 2 and 4. The walls $2a, \ldots, 2e$ are inclined relative to said axis X, and they converge forwards.

The walls $2a, \ldots, 2e$ are disposed coaxially and between them they leave annular openings $3a, \ldots, 3d$. The dimensions and the organization of the walls $2a, \ldots, 2e$ are selected so that when seen in front view and at zero incidence, i.e. when the axis of symmetry X coincides with the direction E of gas flow striking the shield 1, said shield presents a solid surface (FIG. 1), whereas when the angle of incidence $\alpha$ is not zero, it presents a surface with gaps (FIG. 3) so as to create an aerodynamic force couple tending to return the shield 1 towards a position of zero incidence. The outside diameter of the shield 1 is selected so that it presents sufficient braking area and offers heat protection, by deflecting the flow of gases away from the body 5 of the satellite towards external elements (solar panels, sensors, . . . ) of the satellite, placed on the body 5 of the satellite downstream from the shield 1 relative to the gas flow.

The radially inner edges $2a', 2b', 2c', 2d'$ of the walls $2a, 2b, 2c,$ and $2d$ coincide in projection along the direction of the axis X, respectively with the radially outer edges $2b'', 2c'', 2d'', 2e''$ of the walls $2b, 2c, 2d,$ and $2e$. The walls $2a, \ldots, 2e$ extend axially over the same height, with the radially inner edges (or front edges) $2a', \ldots, 2e'$ being situated in a first plane $P_1$ perpendicular to the axis X, and with the radially outer edges $2a'', \ldots, 2e''$ (or rear edges) being situated in a second plane $P_2$ perpendicular to the axis X, and situated downstream therefrom.

The walls $2a, \ldots, 2e$ are assembled together by any appropriate structure known to the person skilled in the art, e.g. by radial stiffeners 4, with there being eighteen of them in the example described, extending radially and uniformly spaced apart around the axis X. In the example described, the stiffeners 4 are in the form of pairs of parallel rods extending in said above-mentioned first and second planes, and forming spacers for the walls $2a, \ldots, 2e$. To further improve stiffness, it is possible to use additional structural elements such as bars connecting the wall $2a$ (or the ends of some of the stiffeners) to the sides of the body of the satellite.

The shield shown in FIGS. 1 to 4 is fitted to the front of a satellite whose body 5 is elongate along a longitudinal axis coinciding with the axis X. The shield 1 is fixed to the body 5 of the satellite by any appropriate means known to the person skilled in the art, e.g. by holding struts 8 connecting the rods of the stiffeners 4 situated in the plane $P_2$ to the front face 7 of the body 5. In a variant, the holding struts may also connect the wall 22 to the body of the satellite.

The radially inner edge 2e' of the wall 2e defines a central opening 6 of the shield 1, and its diameter is preferably selected to be equal to the diameter of the front face 7 of the body 5 of the satellite, as shown, such that at a zero angle of incidence, the plane front face 7 of the body 5 of the satellite opposes the flow passing through the opening 6. At a non-zero angle of incidence, the wall 2e and the front face 7 provide a non-zero through section to the flow, between the holding struts 8.

In the example described, the front face 7 of the body 5 of the satellite has a diameter equal to 800 mm, the shield 1 has an outer diameter (measured from the edge 2a") equal to 2000 mm, and an inner diameter (measured from the edge 2e') equal to 800 mm. The radially inner edges 2a', ..., 2e' of the walls 2a, ..., 2e are spaced apart at radial intervals of 120 mm. Each wall 2a, ..., 2e has a height of 200 mm and the same half-angle at the apex, which is equal to 31° in the example described. The position of the center of thrust moves along the axis of symmetry X and lies between 200 and 300 mm behind the interface between the shield and the body of the satellite, depending on where the angle of incidence α between the axis of symmetry X and the relative speed between the satellite and the atmosphere lies in the range 5° to 31°. In FIG. 5, arrow P designates the direction of the resultant of the thrust forces on the satellite for an angle of incidence α equal to 30°, which corresponds to FIGS. 3 and 4. The center of thrust C is situated on the axis of symmetry X behind the center of gravity G, thereby guaranteeing that the attitude of the satellite is stable.

Finally, the invention makes it possible to have a braking shield of small size in the longitudinal direction, and depending on the position of the center of gravity of the satellite, it either reduces the instability of the satellite, thereby making it possible to make do for controlling the attitude of the satellite with a system having control capacity that is less than that which would be necessary in the absence of the shield, or else, and preferably, to ensure that the attitude of the satellite is stabilized in self-contained and completely passive manner, as is the case for the example described. The shield 1 preferably does not include any moving parts requiring a stowage and deployment mechanism, thus ensuring that it is particularly reliable. Also, the shield directs the flow of gas striking the satellite radially outwards and provides complete heat protection to external elements on the body of the satellite (sensors, antennas, solar cells) situated behind the shield.

The invention is not limited to the example described, and in particular, without going beyond the ambit of the present invention, it is possible to modify the number and the shape of the walls constituting the shield, e.g. to use a shape that is polygonal rather than being circularly symmetrical. The front face of the satellite body may also penetrate inside the shield, and indeed project beyond the plane $P_1$. The walls constituting the shield may be folded to reduce bulk during launch and may subsequently be deployed in flight by an appropriate mechanism.

A shield of the invention can be fitted to any type of spacecraft, e.g. a planetary probe that is to make use of atmospheric braking to reach a low orbit around any heavenly body.

I claim:

1. A braking and heat protection shield (1) for a spacecraft (5), the shield being situated at the front of the spacecraft to oppose a flow of gas striking the spacecraft, and being characterized in that it comprises a succession of coaxial walls (2a, ..., 2e) having axial symmetry about the longitudinal axis (X) of the spacecraft, the dimensions and the organization of said walls being selected so that, in front view and at zero incidence, the shield presents a solid surface and said walls leave between them annular openings (3a, ..., 3d) of through section offered to the flow that increases with the increasing angle of incidence of the spacecraft, so as to create an aerodynamic force couple tending to return the spacecraft to a position of lesser incidence.

2. A shield according to claim 1, characterized in that said walls (2a, ..., 2e) are inclined relative to said longitudinal axis, and converge forwards.

3. A shield according to claim 2, characterized in that the leading edges (2a', ..., 2e') lie in a common plane ($P_1$).

4. A shield according to claim 2, characterized in that the trailing edges (2a", ..., 2e") of said walls (2a, ..., 2e) lie in a common plane ($P_2$).

5. A shield according to claim 1, characterized in that each of said walls (2a, ..., 2e) is in the form of a truncated cone.

6. A shield according to claim 5, characterized in that said walls all have the same half-angle at the apex.

7. A shield according to claim 6, characterized in that the half-angle at the apex of said walls is equal to 31°, their axial extent being 200 mm, and their radial spacing being 120 mm.

8. A satellite fitted with a shield according to claim 1.

* * * * *

UNITED STATES PATENT AND TRADEMARK OFFICE
CERTIFICATE OF CORRECTION

PATENT NO. : 5,853,151
DATED : December 29, 1998
INVENTOR(S) : Thibéry CUSSAC

It is certified that error appears in the above-identified patent and that said Letters Patent is hereby corrected as shown below: On the title page:

Please insert priority information

--[30]  Foreign Application Priority Data

December 19, 1994 [FR]   France   94/15236--.

Signed and Sealed this

Nineteenth Day of December, 2000

Attest:

Q. TODD DICKINSON

*Attesting Officer*  *Commissioner of Patents and Trademarks*